United States Patent [19]

Opower

[11] Patent Number: 4,646,314
[45] Date of Patent: Feb. 24, 1987

[54] HIGH-POWER LASER HAVING AN UNSTABLE OPTICAL RESONATOR

[75] Inventor: Hans Opower, Krailling, Fed. Rep. of Germany

[73] Assignee: W. C. Heraeus GmbH, Hanau-Main, Fed. Rep. of Germany

[21] Appl. No.: 848,915

[22] Filed: Apr. 7, 1986

Related U.S. Application Data

[63] Continuation of Ser. No. 602,223, Apr. 19, 1984.

[30] Foreign Application Priority Data

Apr. 29, 1983 [DE] Fed. Rep. of Germany ....... 3315620

[51] Int. Cl.⁴ ................................................ H01S 3/08
[52] U.S. Cl. ...................................... 372/95; 372/99; 372/93; 372/108
[58] Field of Search ...................... 372/95, 92, 97, 98, 372/99, 20, 101, 107, 108

[56] References Cited

U.S. PATENT DOCUMENTS

| | | | |
|---|---|---|---|
| 4,229,710 | 10/1980 | Shoshan | 372/102 |
| 4,399,540 | 8/1983 | Bücher | 372/20 |
| 4,433,418 | 2/1984 | Smith | 372/95 |
| 4,484,334 | 11/1984 | Pressley | 372/101 |

OTHER PUBLICATIONS

Borghese et al; "Unstable-Stable Resonators with Toroidal Mirrors", Appl. Opt., vol. 20, No. 20, 5 Oct. 1981.
Phillips et al; "Off-Axis Unstable Laser Resonator: Operation", Appl. Opt., vol. 15, No. 9, Sep. 76.
Ananev et al; "Solid Laser with a High Spatial Coherence of Radiation", Sov. Jour. Quant. Elect., vol. 1, No. 4, Jan.-Feb. 72.
Dyer et al; "Studies of a TEA $CO_2$ Laser with a Cylindrical Mirror Unstable Resonator", Opt. Comm., vol. 15, No. 5, Sep. 1975.
Deka et al; "High-Power Tuned TEA $CO_2$ Laser Using a Three-Mirror Confocal Unstable Resonator", Appl. Opt., vol. 18, N. 22, 15 Nov., 1979.

*Primary Examiner*—Leon Scott, Jr.
*Attorney, Agent, or Firm*—Felfe & Lynch

[57] ABSTRACT

A high-power laser, especially one with a gaseous excitation medium, having an unstable optical resonator is disclosed. Fully reflecting mirrors, whose planes of curvature are parallel to one another, form the ends of the unstable optical resonator. A third mirror is concavely curved in a plane perpendicular with respect to the other two mirrors. The mirrors have a rectangular cross section and are preferably metallic. The mirrors constituting the ends of the unstable optical resonator form a confocal resonator.

6 Claims, 1 Drawing Figure

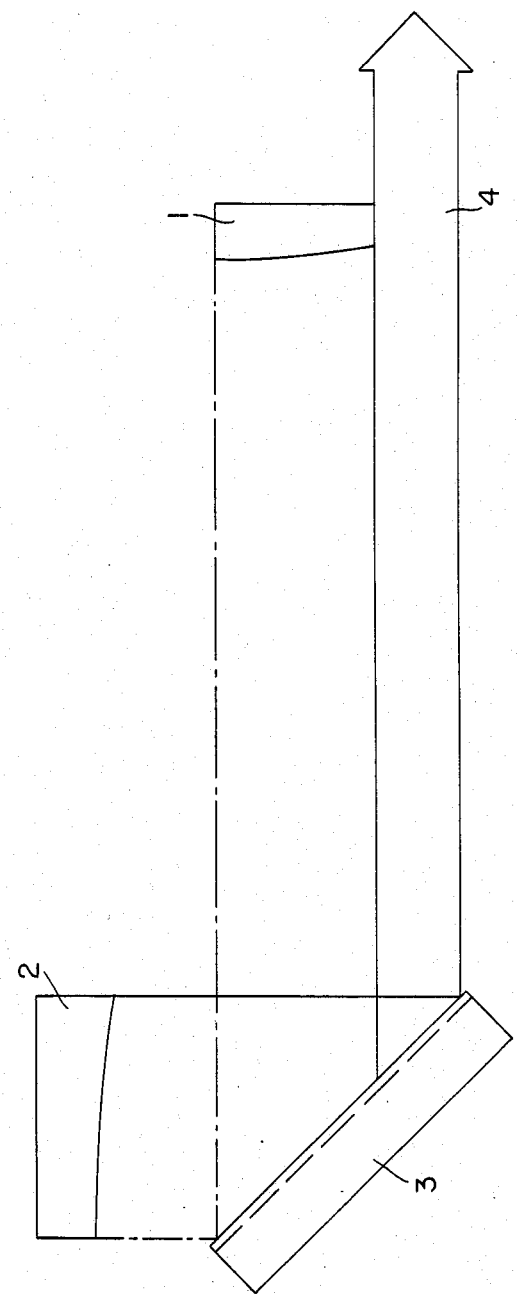

HIGH-POWER LASER HAVING AN UNSTABLE OPTICAL RESONATOR

This application is a continuation of application Ser. No. 602,223, filed Apr. 19, 1984.

BACKGROUND OF THE INVENTION

The invention relates to high-power lasers, especially lasers using a gaseous, excitable medium, having an unstable optical resonator composed of fully reflective mirrors of cylindrical curvature.

High-power lasers, such as carbon dioxide high-power lasers, are known, which are equipped with semitransparent resonator mirrors. The semitransparent mirror materials used, such as zinc selenide for example, tend to deform under the action of the radiation. Such deformation leads to output fluctuations and to an alteration of the radiation profile of the laser and thus to inconsistent operating results.

For this reason, unstable optical resonators are used in high-power lasers. Fully reflective mirrors are used. The laser beam leaves the unstable optical resonator through a free opening. Conventional unstable optical resonators are equipped with circular mirrors of spherical curvature. The output laser beam in this case has an annular cross section.

In many cases, in transverse-flow gas lasers for example, the rotational symmetry of the mirrors is simply no adequate match for the excitation chamber of the laser. Here the use of unstable optical resonators with rectangular cylinder mirrors becomes desirable. The laser beam is in this case discharged at an offset from the axis and presents a solid, rectangular profile.

In this known system using an unstable optical resonator, the resonator behaves in the plane perpendicular to the plane of curvature of the cylinder surfaces (this plane of curvature is called an unstable plane) like a planar Fabry-Perot resonator, resulting in a high laser threshold and extreme delicacy of adjustment.

To avoid this, a proposal was made in "Appl. Optics, Vol. 20, No. 20, pp. 3547-3552, Oct. 15, 1981" for the use of toroidal mirrors instead of the cylindrical mirrors, one of the two mirrors having an additional concave curvature in the plane perpendicular to the unstable plane. The making of toroidal mirrors, however, is extraordinarily difficult and expensive.

It is the object of the invention to create a high-power laser having an unstable optical resonator, which will make optimum use of an excitation chamber of approximately rectangular cross section.

SUMMARY OF THE INVENTION

This object is achieved in accordance with the invention, in the high-power laser defined above, by providing the resonator with at least 3 mirrors of cylindrical curvature, of which those whose planes of curvature are parallel to one another define the unstable optical resonator, while the third mirror, or each additional mirror, is curved concavely in a plane perpendicular with respect to the first-mentioned mirrors.

It is advantageous for all of the mirrors to have a rectangular cross section. The two mirrors defining the ends of the unstable resonator form a confocal resonator. In the simplest case, an unstable optical resonator designed in accordance with the invention is made up of three mirrors, and the mirror having the concave curvature perpendicular to the unstable plane is a deflecting mirror. The deflection is free of image error and additionally presents the advantage that, when metal mirrors are used, the output laser beam is always linearly polarized.

The various features of novelty which characterize the invention are pointed out with particularly in the claims annexed to and forming a part of this specification. For a better understanding of the invention, its operating advantages and specific objects obtained by its use, reference should be had to the accompanying drawing and descriptive matter in which there is illustrated and described a preferred embodiment of the invention.

BRIEF DESCRIPTION OF THE DRAWINGS

The drawing is a diagrammatic representation of the a plan view of the plane of the optical axis.

DESCRIPTION OF PREFERRED EMBODIMENT

The cylindrical mirrors 1 and 2, whose planes of curvature are parallel to one another, form the end elements of an extra-axial unstable resonator. The radii of curvature of mirrors 1 and 2 are subject, in the case of a confocal resonator, to the condition $R_1/2$ + distance of mirrors 1-2 $L=R_2/2$, wherein $R_1$ and $R_2$ are the respective radii of curvature of mirrors 1 and 2.

The absolute values of $R_1$ and $R_2$ are functions of the degree of the output desired; the latter is in geometrical approximation $1-R_1/R_2$. Radii $R_1$ and $R_2$ clearly determine the confocal condition and the output.

Mirror 3 is a deflecting mirror which has a cylindrical curvature in a plane perpendicular to the plane of the drawing. The reference number 4 designates the laser beam. The mirrors 1 and 2 and the angle mirror 3 are preferably in the form of metal mirrors.

The mirrors 1, 2, 3 in the drawing have cylindrical curvatures, the plane of curvature of cylinders 1 and 2 being the drawing plane and the plane of curvature of cylindrical mirror 3 lying at right angles to the drawing plane. The azimuth angle at which the plane of curvature intersects the drawing plane need not be specified exactly; but preferably is less than 45° to the longitudinal axis. However, the angle should not be too small if definedly linearly polarized radiation is to be achieved.

EXAMPLE

In a laser diagrammatically depicted in the Figure, mirrors 1 and 2 are three meters apart. The radius of curvature of cylindrically convex mirror 1 is 11 meters, and that of cylindrically convex mirror 2 is 17 meters. This gives a confocal arrangement because $11/2+3=17/2$ (half the radii of curvature correspond each time to the focal distances). The radii of curvature for mirror 3 will be in the range between 10 m and 40 m, depending on the geometrical dimensions of the resonator and in this example is 25 meters.

The terms and expressions which have been employed are used as terms of description and not of limitation, and there is no intention in the use of such terms and expressions of excluding any equivalents of the features shown and described or portions thereof, it being recognized that various modifications are possible within the scope of the invention.

I claim:

1. A high-power laser having an excitation chamber with an unstable optical resonator, said resonator being limited by mirrors having cylindrical curvature, the first and second of said mirrors defining the unstable optical resonator, and each of said mirrors having a plane of curvature which is parallel to the plane of curvature of the other, said first and second mirrors respectively having a convex and concave curvature, and a third cylindrical mirror concavely curved in a plane perpendicular with respect to said first and second mirrors at an angle of 45° or less to an optical axis of said resonator to attain a linear polarized beam.

2. The high-power laser of claim 1, wherein the mirrors are of rectangular cross section.

3. The high-power laser of claim 1, wherein the first and second mirrors form a confocal resonator.

4. The high-power laser of claim 1, wherein the mirrors are metallic mirrors.

5. The high-power laser of claim 1, wherein the laser employs an excitable gaseous medium.

6. The high-power laser of claim 1, wherein the excitation chamber is of rectangular cross section.

* * * * *